July 5, 1932. H. K. TAYLOR 1,865,713
INSECT TRAP
Filed Oct. 23, 1929
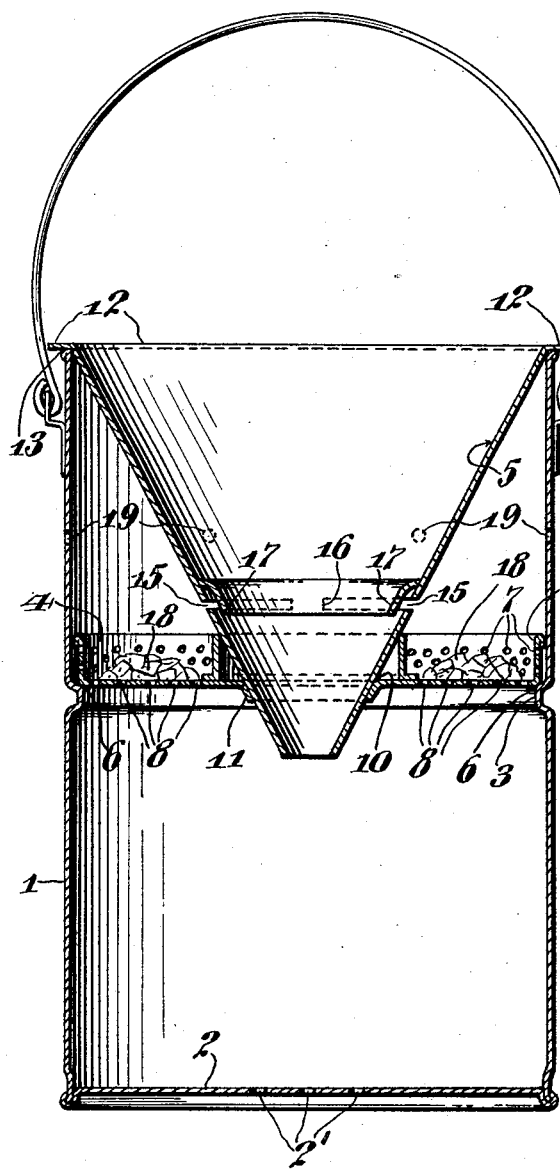
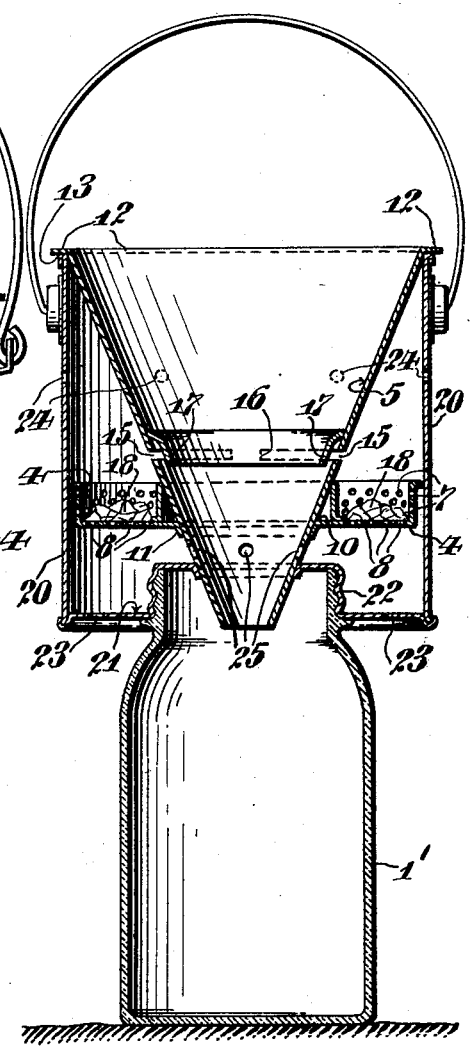
Inventor
Herbert K. Taylor
By Cyrus N. Anderson
Attorney Patented July 5, 1932

1,865,713

UNITED STATES PATENT OFFICE

HERBERT K. TAYLOR, OF ELKINS PARK, PENNSYLVANIA, ASSIGNOR TO GEORGE D. ELLIS AND SONS, INCORPORATED, OF PHILADELPHIA, PENNSYLVANIA, A CORPORATION OF PENNSYLVANIA

INSECT TRAP

Application filed October 23, 1929. Serial No. 401,649.

My invention relates broadly to insect traps but has been designed primarily for use as a trap for catching Japanese beetles which infest certain portions of the States of New Jersey and Pennsylvania.

In the use of traps of this character it is usual and practically necessary to bait the same with a substance the odor of which attracts the beetles. Unless some such attractant or bait is employed the traps have been found to be ineffective in the catching or trapping of the beetles or other insects.

It is desirable that the bait or attractant for the Japanese beetles or other insects shall be located inside the trap and it is the general object of the invention to provide means whereby when the bait or attractant is so supported the odor or scent characteristic thereof is not prevented from radiating therefrom.

It also is an object of the invention to provide means within the receptacle or container of a trap for supporting an insect bait or attractant in association with means for protecting the said bait or attractant from rain or moisture, which means is of a character to permit the passage therethrough of insects into the trap and also to permit the radiation of the odor or scent characteristic of the bait or attractant.

To the foregoing and other ends the invention comprehends the construction and arrangement of parts as hereinafter described in detail, particularly pointed out in the claims appended hereto and illustrated in the drawing wherein I have illustrated my invention embodied in two different forms of traps.

In the drawing:

Fig. 1 is a view in vertical longitudinal central section of an insect trap provided with means embodying the invention; and Fig. 2 is a similar view of a modified construction of trap provided with means embodying the invention.

In describing the invention I shall refer first to Fig. 1 wherein is shown a receptacle 1 which may be cylindrical in cross section as illustrated but may be of other cross sectional shape as desired. The receptacle may consist of sheet metal as shown. The bottom 2 of the receptacle may be provided with openings as indicated at 2'. The side walls of the receptacle as shown in Fig. 1 are indented from the outside inwardly to form an inwardly extending ridge or bead 3 which constitutes means for supporting an annular shallow dish or container 4 and a funnel 5 supported or partially supported thereby. The exterior diameter of the annular dish or container 4, the top of which is open as shown, is slightly less than the internal diameter of the receptacle 1 but greater than the internal diameter of the ridge or bead 3. When the shallow open-topped annular dish member or container 4 is lowered into the receptacle 1 the lower corner or edge thereof contacts with the upper side of the ridge 3 as indicated at 6 so that the member 4 and the funnel are supported by the said ridge. The side walls of the dish or container 4 are provided with perforations as shown at 7 and the bottom thereof also is provided with perforations as shown at 8. The inner wall, however, of the said annular dish member or container 4 is not shown as being provided with perforations but may be so provided if desired. The central portion of the bottom of the dish member or container 4 inside of the inner wall thereof is provided with an opening as indicated at 10 which has a downwardly and inwardly extending flange projecting from the edge thereof as indicated at 11. The lower end portion of the funnel projects into the said opening and is seated against the said flange 11, the latter preferably being inclined to correspond to the taper of the funnel 5 so that said funnel will fit the same closely. If desired the funnel may be secured to the flange 11 by soldering or otherwise as may be preferred but this is not necessary. The upper end of the funnel is provided with a lateral flange 12 which overlies and rests upon the upper edge of the receptacle 1 as indicated at 13. The dimensions of the parts involved are so related to each other as to permit the flange 12 when the dish or container 4 is in the position shown in Fig. 1 of the drawing to rest upon the top of the container in the manner as shown at 13. Although the resting of the flange 12 upon the top edge of the receptacle 1 would operate to support the funnel in place yet it is preferred that the same shall rest also against the flange 11 even though it may not be secured permanently to said latter flange.

The contact of the flange 12 with the top edge of the receptacle 1 closes the latter so as to prevent the entry of water or moisture into the said receptacle 1.

The funnel is provided intermediate its ends and preferably near the top of the annular dish or container 4 with slots 15 located in a plane extending transversely thereof, the ends of said slots being separated from each other by strips 16, only one of such strips being shown. An annular shield or cover 17, bent in the direction of its width as shown in Fig. 1 of the drawing, is secured at its upper edge within and to the funnel so as to overlie the slots 15 and thus prevent water which may catch in the funnel and flow therethrough from passing from the funnel through the said slots 15 onto the bait indicated at 18 which may be located in the annular dish or container 4. The upper outer edge portion of the shield or cover 17 is of considerably greater diameter than the lower inner edge portion thereof. The upper edge fits closely against the inner surface of the circular portion of the funnel 5 in a plane a short distance above the slots 15 and is secured thereto by any means or method which may be found to be suitable, as by soldering and the like. The shield or cover 17 is bowed inwardly or toward the axis of the cone-shaped funnel 5 so that its lower portion is spaced from the inner side or surface of the adjoining opposing portion of the said funnel, and the said lower end thereof overlies and extends beyond the slots 15 so that any water which may enter the top of the funnel flows over the shield or cover and is discharged from the bottom of the funnel into the bottom portion of the receptacle 1 from which it may escape through the openings 2'. The spacing of the shield or cover 17 from the portion of the funnel including the slots 15 permits the odors which emanate and radiate from the bait 18 within the receptacle below the funnel 5 to pass through the said slots and to radiate from the trap into the surrounding air to attract the beetles or other insects for which the bait may be attractive and cause them to travel to the trap. In their endeavor to reach the bait they enter the top of the funnel 5 and are guided thereby through the open lower end thereof into the receptacle 1. Preferably the receptacle 1 is provided with openings as indicated at 19. The presence of the openings 2' and the openings 19 facilitates the passage of a current of air upwardly through the receptacle 1 to thereby effect better radiation or scattering of the odors of the bait from the trap.

If desired, as already suggested, the funnel may be separated from the annular dish member or container 4 but preferably the two are connected together so that in removing the funnel from the receptacle 1 the dish or container 4 is at the same time removed.

In Fig. 2 of the drawing I have shown my invention embodied in a somewhat different construction of trap wherein the receptacle 1' consists or may consist of an ordinary jar such as a "Mason" jar. In the form of construction shown in Fig. 2 the parts and features 4, 5, 7, 8, 11, 12, 15, 16, 17 and 18 are identical with the parts and features correspondingly numbered in Fig. 1 of the drawing. In the construction illustrated in Fig. 2, however, the flange 11 is permanently secured to the funnel 5 by soldering or otherwise so that the said member 4 is carried by the funnel. The funnel projects into a housing 20 having a bottom 21 the central portion of which projects upwardly as indicated at 22 and is internally screw-threaded as shown by which it is adapted to engage the external screw-threads upon the upper open end of the receptacle 1'. The outside or lateral portions of the bottom 21 are provided with openings 23. The side of the housing 20 is provided with openings 24. The funnel is provided with openings or perforations 25 below the bait holder 4. In the use of the trap in case of rain water would enter the top of the funnel and would pass therethrough into the receptacle 1'. It is important that the bait 18 be kept dry and it therefore is important that if the water which entered the receptacle 1' through the funnel 5 were sufficient to more than fill the receptacle it may flow through the openings or perforations 25 into the housing 20 and escape therefrom through the openings or perforations 23 in the bottom 21. By this means the bait 18 in the holder 4 therefor may be prevented from being wetted by an overflow of the water from the receptacle 1'. In the construction as illustrated in Fig. 2 it will be apparent that the funnel 5 with the parts carried thereby and the housing 20 may be sold independently of the receptacle 1' and that the said housing 20 may be mounted upon jars or other receptacles of the character of that illustrated which may be in the possession of the purchasers of the said parts 20 and 5, the latter carrying the bait container 4.

It will be seen that by my invention I have provided a construction of simple design having characteristics by which it is rendered highly efficient and desirable.

Having thus described my invention, what I claim and desire to secure by Letters Patent is:

1. An insect trap comprising a receptacle, a bait holder mounted within the said receptacle intermediate its opposite ends, a funnel projecting into the said receptacle from the top thereof, the inner end thereof extending beyond said bait holder, the said funnel being provided with a slot located in a plane extending transversely thereof, the said plane being located above the bait holder, and a shield mounted within and overlying and spaced from the portion of the said funnel within which the said slot is located, to prevent water flowing downwardly in said funnel from passing through said slot.

2. An article of manufacture for use in an insect trap comprising a funnel having a slot therein located in a plane extending transversely of said funnel and a protecting cover connected at its upper edge to the inner side of said funnel above the said slot and extending inwardly and downwardly of the said funnel to overlie the said slot.

3. An insect trap comprising, in combination, a funnel having a slot therein which is located in a plane extending transversely of the said funnel, means provided in the said funnel which overlies and which is spaced from the adjoining portion of the said funnel provided with the said slot to prevent a liquid, which may be flowing downwardly through said funnel from passing through said slot, and a bait container having a bottom and side walls and having an opening through its bottom into which the lower end of said funnel projects.

4. An insect trap comprising a receptacle for holding trapped insects, a bait holding container supported within the said receptacle intermediate the opposite ends thereof, the central portion of the bottom of said container having an opening therethrough, a funnel projecting from the top of said receptacle into the opening in the bottom of the said container, said funnel having a slot therein in adjoining relation to the top of the said container, and means mounted within the said funnel and extending over the said slot and in spaced relation thereto to permit the passage therethrough of odor from bait which may be contained in the said container and to prevent the passage of a liquid through the said slot into said container.

5. An insect trap comprising a receptacle having an indentation in its side to provide an inwardly projecting ridge, an open-topped container for holding insect bait located within the said receptacle and supported upon the said ridge, the said container having a central opening extending therethrough, a funnel extending from the top of the said receptacle thereinto and having its lower end projected through the central opening in the said container and contacting with the edge thereof, the top end of the said funnel having a laterally extending flange which extends over the top edge of the said receptacle and the said funnel having a slot therein located above the top of the said container and in a plane extending transversely of said funnel, and a protecting cover which is secured at its upper edge to the inner side of the said funnel in adjoining relation to the said slot, the said protecting cover being bowed inwardly and extending downwardly in spaced relation to the adjoining portion of the said funnel to overlie the said slot.

6. In an insect trap the combination of a funnel having a slot extending transversely thereof, means overlying and spaced from the said slot to prevent a liquid which may flow through the said funnel from escaping through the said slot, and a bait holder secured to the said funnel below the said slot.

7. In an insect trap the combination of a funnel having one or more slots provided therein, said slots being located in a plane extending transversely of the said funnel and also having an annular cover strip secured at its upper edge to the inner side of the said funnel above the said slot, the said cover strip projecting inwardly and downwardly so as to overlie the said slot, and a bait holding container secured to the said funnel between the said slot and the discharge end thereof.

In testimony that I claim the foregoing as my invention I have hereunto signed my name this 22nd day of October, A. D., 1929.

HERBERT K. TAYLOR.